United States Patent [19]

Jiang et al.

[11] Patent Number: 4,908,490

[45] Date of Patent: Mar. 13, 1990

[54] TECHNOLOGY AND EQUIPMENT OF THE STRESSED SKIN SHEET COVERING FOR LARGE PASSENGER VEHICLES

[75] Inventors: Xicheng Jiang; Changgong Zhang; Yizhi Gao; Shiqiao Deng, all of Nanling Changchun, China

[73] Assignee: Jilin University of Technology, Changchun, China

[21] Appl. No.: 210,856

[22] Filed: Jun. 24, 1988

[30] Foreign Application Priority Data

Jun. 25, 1987 [CN] China ............................ 87104456

[51] Int. Cl.⁴ ............................................ B23K 11/00
[52] U.S. Cl. ....................................... 219/50; 29/448
[58] Field of Search ................. 219/50, 117.1; 29/448

[56] References Cited

U.S. PATENT DOCUMENTS 2,716,688 8/1955 Lackner ............................ 219/50

Primary Examiner—Clifford C. Shaw
Attorney, Agent, or Firm—Birch, Stewart, Kolasch & Birch

[57] ABSTRACT

This invention is related to the process and apparatus for applying stressed skin sheet coverings to large passenger vehicles. The apparatus for the process, provided by this invention includes a single phase transformer, conductors, electric contactors and a guiding apparatus. The present invention uses a specialized transformer, capable of producing a strong electric current of low voltage as an energy source, utilizing the steel skin sheet as a resistor element in the output circuit, welding the steel sheet onto the frame while the steel sheet is heated by the electric current passing through the sheet, thereby elongating the sheet at a set value due to the rise in temperature, cutting off the electricity and welding the upper and lower sides quickly onto the frame, thus finishing the process of skin covering and resulting in residual stresses within the steel skin sheet. By the present invention not only can high efficiency, high quality and low cost be realized, but also the strength of railway, highway passenger cars, and other large vehicles can be improved with respect to their flat surfaces.

4 Claims, 3 Drawing Sheets

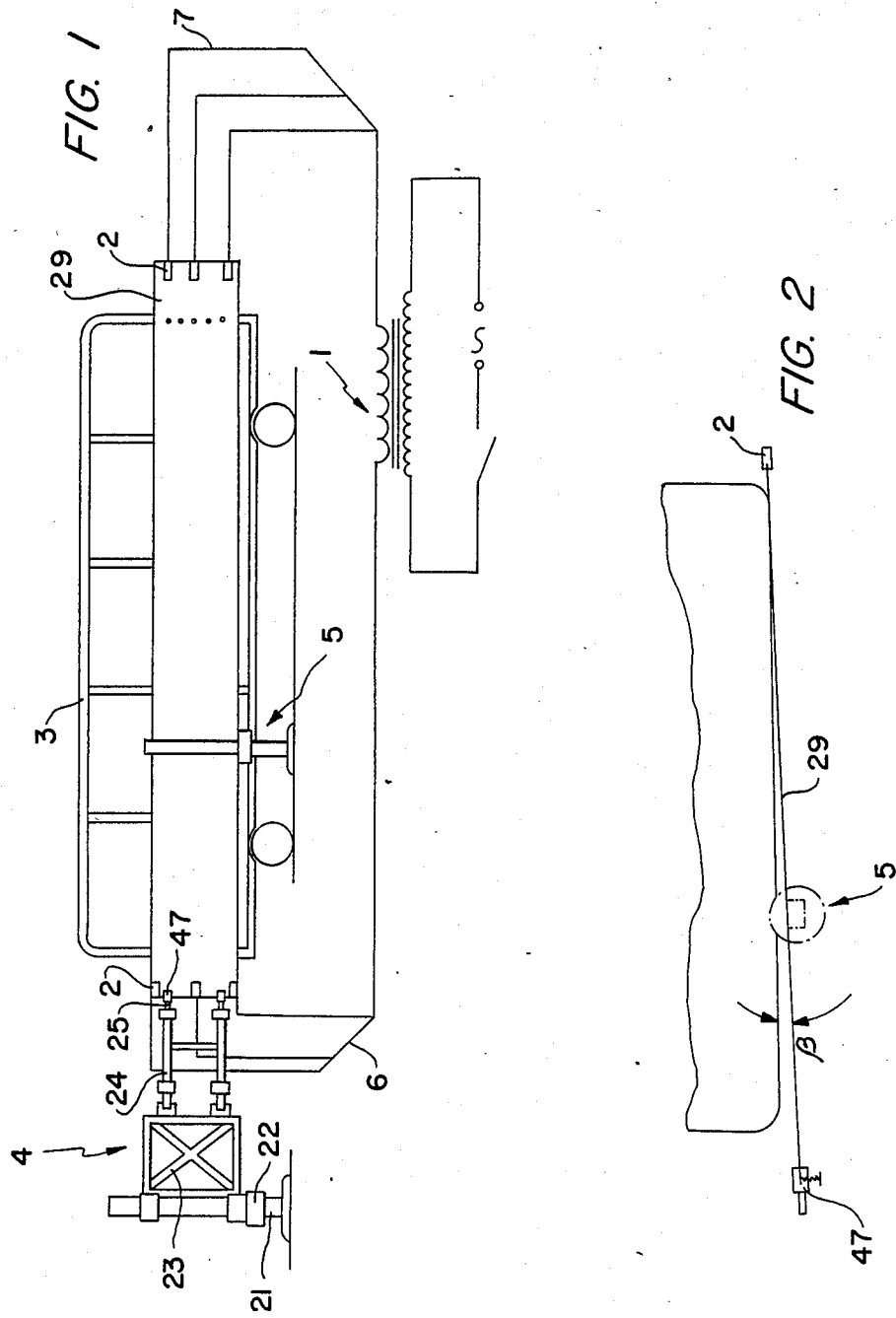

TECHNOLOGY AND EQUIPMENT OF THE STRESSED SKIN SHEET COVERING FOR LARGE PASSENGER VEHICLES

BACKGROUND OF THE INVENTION

1. Field of the Invention

This invention is related to the technology and equipment for stressed metal skin sheet coverings, and especially for the technology and equipment of stressed skin sheet coverings for buses and railway rolling stock.

2. Description of Related Art

At present there are three known methods for applying stressed skin sheet coverings. The first method is a mechanical stretching, i.e. of welding the steel sheet as a skin cover onto the frame of a passenger vehicle under mechanical stretching.

By this technology the equipment needed for stretching is heavy, expensive and inefficient. It requires two processes: The initial and final stretching processes, and the stress distribution is not uniform. The second method uses electromagnetic induction heating for stretching. In this process the electricity consumption is also very large and the heating is not uniform. The third method presently applied uses a heating box for baking the steel skin sheet (see Chinese Patent No. CN 85101016A). Similar to the above mentioned technologies, the electricity consumption is very large, the heating is not uniform, and the operation is quite inconvenient.

The present invention uses the method of heating by the direct introduction of electricity into the steel skin sheet. Under the heating action of the electrical current the steel skin sheet is heated and stretched on its own, and then fixed by welding while it is still hot. After cooling, the residual stresses in the horizontal and vertical directions of the plane of the steel sheet have already been developed, so as to obtain a good result of skin covering.

Compared with the previous techniques the present invention provides obvious advantages. First of all, according to the technology of this invention, simple equipment is used, a reduction in cost is achieved, and there is a resulting convenience in operation and long service life. In addition, the electricity consumption is reduced compared to other methods. For steel sheets of 10 m in length, 0.6–0.7 m in width and 1–1.2 mm in thickness the time needed for heating the skin sheet will be no longer than 5 min, and the electricity consumption is no more than 3 kw-hr. For steel sheets of 23 m in length, 0.85 m in width and 1.5–2.5 mm in thickness, the heating time is no more than 25 min and the electricity consumption is no more than 40 kw-hr. Furthermore this invention can be applied to the technology of skin sheet coverings for various vehicles such as a side wall skin sheet covering of railway rolling stock, buses, subway cars, refrigerator cars and so on.

SUMMARY OF THE INVENTION

The method of skin sheet covering, provided by the present invention is first to join one end of steel skin sheet onto the frame by spot welding, then the steel sheet is put on a bracket and fixed by a hooking plate, mounted on this bracket, and clamping both ends of the steel sheet by the electric conductor apparatus. At the same time, the free end of the steel sheet is clamped by the grasper of a guiding apparatus. The guiding apparatus is moved apart from the frame so as to develop an angle $\beta$ between the steel sheet for skin covering and the cover plane of the frame. After turning on the electricity while the steel sheet stretches to the predetermined elongation value by heating, the guiding apparatus is moved back so as to fit the steel sheet in contact with the cover plane of the frame. The free end is then joined to the frame by spot welding. Finally after the electricity has been turned off, the bracket, guiding apparatus and electric conductor apparatus are removed. The position of the welding spots is determined by measuring equidistant sections. The upper and lower sides are welded spot by spot by this method onto the transverse girders of the frame, thus the technology of skin sheet covering is finished.

Another method of skin sheet covering, provided by this invention is at first to hang the insulation plate and the adjusting plate on the transverse girder of the frame. After positioning and alignment, one end of the steel sheet is welded onto the frame for skin covering by spot welding. The electromagnetic holding plates are put on both ends of the steel sheet, and then the electricity to the holding plates is turned on. The holding plate is connected at the free end with the guiding cylinder by an iron chain. The cylinder is started and the transformer is switched on so as to introduce the current throughout the steel sheet. While the steel sheet stretches at a set elongation value by heating, the free end of the steel sheet is welded onto the frame by spot welding, the electricity is turned off and air pressure in the cylinder is released, then the guiding apparatus, insulation plate, adjusting plate and electromagnetic holding plate are removed. At the same time the position of the welding spots by measuring equidistant sections is determined, and then the upper and lower sides are welded spot by spot to the girders of the frame, thus finishing the technology of skin sheet covering.

The technology of the stressed skin sheet covering and its necessary equipment provided by this invention will now be described in detail with reference to the accompanying drawings.

BRIEF DESCRIPTION OF THE DRAWINGS

FIG. (1) and FIG. (2) are schematic drawings of one embodiment of the structure of the present invention;

FIG. (3) is a schematic drawing of a bracket for use in the present invention;

Figure 5:
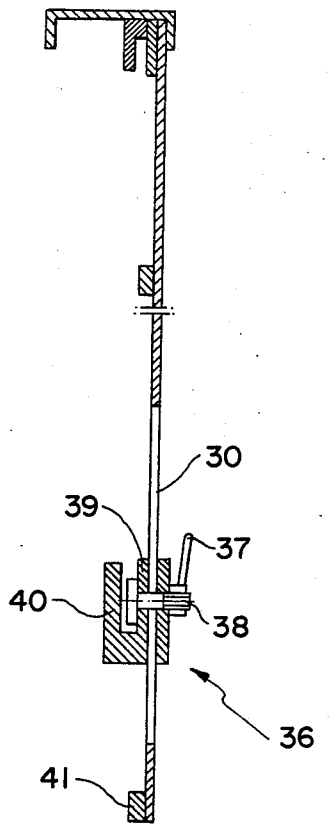

FIG. (4) is a schematic drawing of a guiding apparatus and holder for use in the present invention;

FIG. (5) is a schematic drawing of an adjusting plate for another embodiment of the present invention;

FIG. (6) is a schematic drawing of an electromagnetic plate with electroconducting contactors for use in the present invention; and FIG. (7) is a schematic drawing of the arrangement of the guiding apparatus, insulation plate and adjusting plate for another embodiment of the present invention.

DETAILED DESCRIPTION OF PREFERRED EMBODIMENTS

In FIG. (1) and FIG. (2) reference number 1 is a single phase transformer, reference number 2 refers to a welding holder or the electro-conducting apparatus, 3 is a frame, 4 is a guiding apparatus, 5 is a bracket and 6, 7 are conductors of a secondary coil of the transformer 1. Element 21 is a column, 22 is a lifting nut of the guiding apparatus 4; 23 is a swiveling frame of the guiding apparatus 4, 24 is an adjusting tube, 25 is an adjusting rod, 47 is a grasper and 29 is a steel skin sheet.

In FIG. (3) element 8 is a bracket stand, 9 is a column, 10 is a lifting nut, 11 is the body of the bracket 5, 12 is a small pin, 13 is a supporting sleeve insulator, 15 is a constraining plate, 16 is a hooking plate, 18 is a revolving handle, 19 is a fixing handle and 20 is an insulation spacer.

In FIG. (4), 26 is the fastening bolt of the grasper 47, 27 is an insulation jaw, and 28 is a compressible spring.

FIG. (5), 37 is a handle with a locking nut, 38 is a bolt with a square head, 39 is an insulation spacer, 40 is an insulation sliding block, 41 is an insulation plate, and 30 is a vertical plate.

In FIG. (6), 42 is a spring, 43 is an insulation locking nut, 44 is a guiding sleeve bolt of the electro-conducting contactor, 45 is a panel for fixation of the guiding sleeve bolt and electromagnet, 46 is an electromagnet of the holding plate, 34 is an electro-conducting contactor of the electromagnetic holding plate.

In FIG. (7), 33 is an electromagnetic holding plate, 32 is a guiding cylinder, 35 is an iron chain, 48 is a spring support (balancer), and 31 is an insulation plate.

The process for skin sheet covering, provided by the present invention is as follows. First, one end of the steel skin sheet is welded onto the frame of the passenger car, then the steel sheet is put on the bracket 5 (FIGS. (1) and (2)) and fixed by a hooking plate 16 (keeper) (FIG. (3)). Thereafter the welding holder 2 is attached and, connected with the conductor 6, 7 of the secondary coil of the transformer 1 to both ends of the steel sheet, respectively. The free end of the steel sheet is caught by the grasper 47 of the guiding apparatus 4 in order to guide the steel sheet elongated by electrical heating. After that, the guiding apparatus pulls the free end of the sheet so as to develop a gap with an angle $\beta$ ($\beta = 2° - 5°$) between the steel sheet and the plane of the frame for covering. Meanwhile, an electrical circuit is completed around the specialized single phase transformer, and the electricity is switched on. When the current passes through the steel sheet, it expands as its temperature rises. Once the steel sheet is elongated by thermal deformation at a set value the guiding apparatus fits the steel sheet tightly against the plane of the frame for covering. At this time, the free end of the steel sheet is joined to the frame by spot welding, the electricity is cut off, and the guiding apparatus, the bracket and the electroconducting apparatus or welding holder are removed. Next, the upper and lower sides of the steel sheet are welded spot by spot onto the frame with an equidistant distribution of spots, and then the skin covering is finished. Finally, the surplus portion at both ends of the steel sheet may be cut away by a portable electro-impulse cutting torch or other cutting tool.

Figure 3:
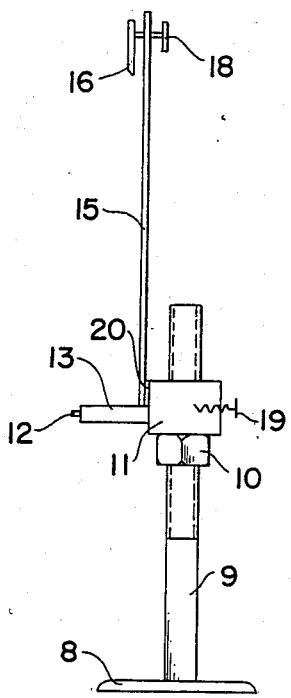
Figure 4:
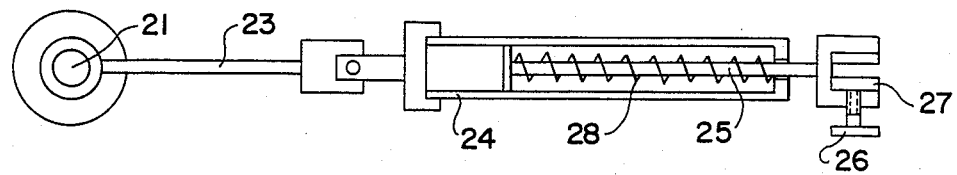
Figure 7:
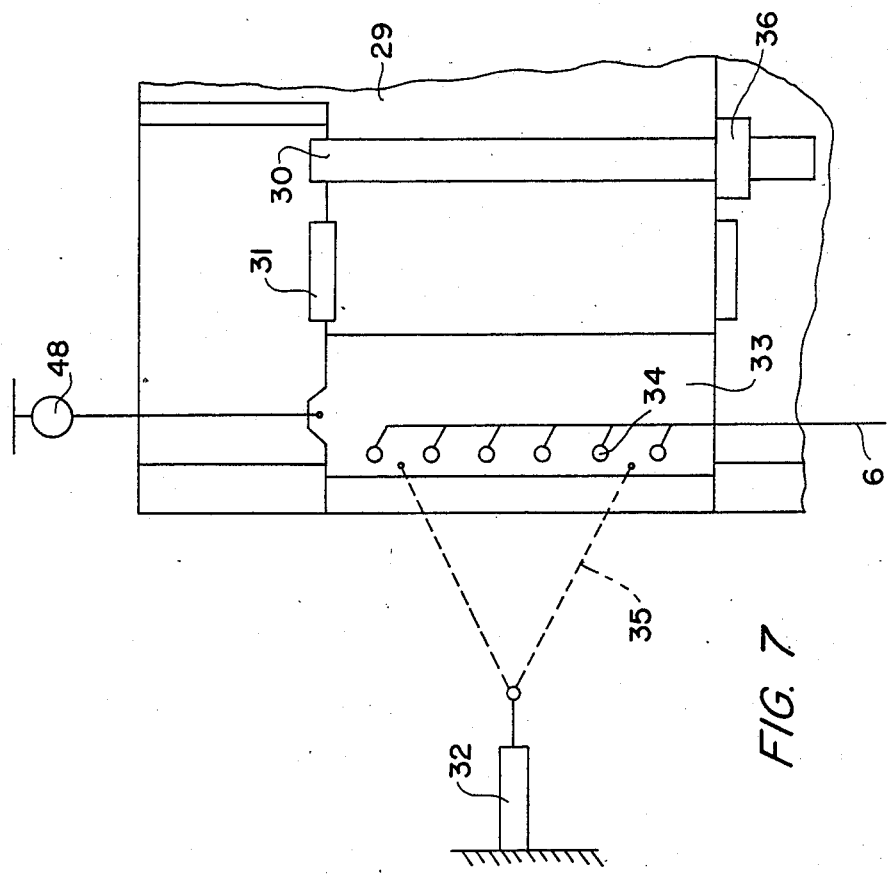
Figure 6:
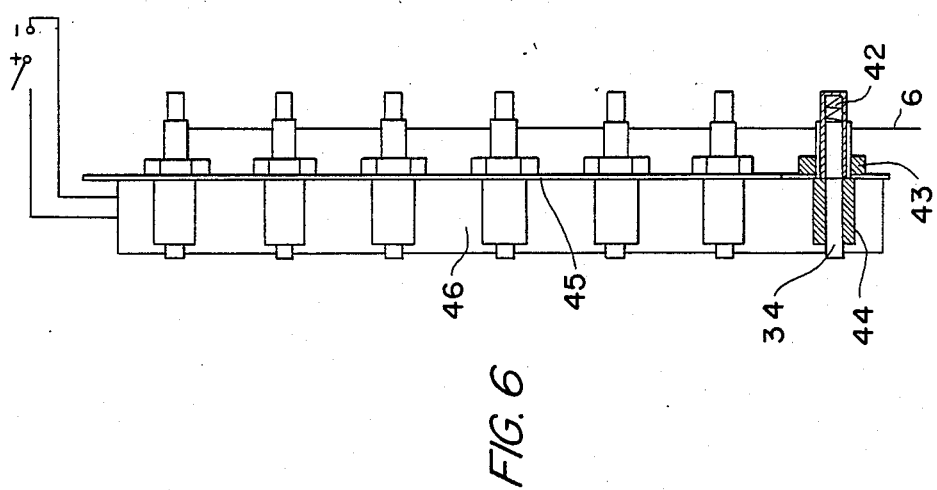

The equipment for realization of the present invention consists of a single phase transformer, a bracket, a guiding apparatus, a conductor and a welding holder or the electro-conduction apparatus. The primary voltage of the transformer is 220 or 380 V, the secondary voltage is 8 V, 12 V, 16 V, or 20 V. The structure of the bracket (FIG. 3)) comprises a column 9, mounted on the stand 8. The column has a lifting nut 10 and body of the bracket 11, on which there is provided a fixing handle 19. An insulation spacer 20, and a small pin 12 with a supporting insulation sleeve 13 thereon. The constraining plate 15 is fixed on the body of the bracket. On the top of the constraining plate there is a revolving handle 18 and hooking plate 16. The guiding apparatus (FIGS. (1) and (4)) consists of the column 21, the lifting nut 22, the swiveling frame 23, the adjusting tube 24, the adjusting rod 25 and the grasper 47 (with the insulation jaws). The lifting nut and the swiveling frame are mounted around the column (with the locking screw on the swiveling frame), and the adjusting tube is joined with the swiveling frame by a binge; the jaw of the grasper is of open type; in one jaw there is a fastening screw 26 such that the end of the steel sheet is put into the jaw and fixed with the fastening screw 26. The swiveling frame 23 can be turned around the column and can be moved up and down so long as the angle $\beta$ has been developed between the steel sheet and the frame, and the swiveling frame will be locked by the locking screw.

Another method for skin sheet covering, provided by the present invention is as follows. First, hanging an insulation plate 31 onto the transverse girder of the frame (FIG. (7)), then putting the steel skin sheet onto the insulation plate, hanging an adjusting plate onto a transverse girder of the frame, adjusting the horizontal position of the steel skin sheet by this adjusting plate (FIG. (5)), welding one end of the steel skin sheet to the frame, moving separately two electromagnetic holding plates 33, hung on a spring support (balancer) 48, towards both ends of the steel skin sheet, switching the holding plates on with electricity after positioning and alignment of the holding plates with respect to the steel skin sheet, attracting the steel sheet firmly by the magnetic force of the holding plates, connecting the electro-contactor 34 of the holding plate with the secondary conductor of the single phase transformer 1, connecting the iron chain 35 of the piston rod of the guiding cylinder 32 with an electromagnetic holding plate near the free end of the steel sheet, producing a guiding or stretching force by starting the cylinder, switching on the electricity of the transformer; and conducting current through the steel sheet. Once the steel skin sheet stretches at a set value of thermal elongation, the free end of the steel sheet is welded spot by spot onto the frame. After the circuit of electromagnetic holding plate and the transformer are cut, the insulation plate 31 and the adjusting plate are removed, and the upper and lower sides of the steel sheet are welded to the frame spot by spot from the middle point toward both ends to form a fixed unit. After cooling of the steel sheet, residual stresses in two directions will be developed, whereupon the unit steel skin sheet covering is finished.

EXAMPLES

The first embodiment of this invention is the skin sheet covering for the side wall of the frame of a highway passenger car. The adopted steel sheet for skin covering is 600 mm in width, 10 m in length, and 1 mm in thickness. A single phase transformer is used with 30 KVA capacity whereas, the usual voltage of the primary coil is 380 V. A secondary voltage of 20 V has been taken.

When the process of skin covering is carried out, one end of the steel sheet should be welded spot by spot onto the terminal part of the frame of the passenger car. Then the bracket 5 (FIG. (1)) is set to support the steel sheet, and catches its upper side firmly by a hooky plate 16, which is located on the top of the bracket so as to keep the steel sheet from inclining. The third step is to clamp the free end of the steel sheet by grasper 47 of the guiding apparatus 4, and to pull it for compressing the spring in the guiding apparatus (in order to pull the steel sheet at all times, while it stretches by heating so as to keep it from bending due to elongation of heating). Then the swiveling frame 23 is turned and offset at an angle β between the steel sheet and the frame so that the whole frame of the car can be excluded from the electric circuit. The electricity consumption would not be increased and the thermal effect of the current would not be reduced. Angle β is 5°.

Thereafter the clamps 2 (welding holder) are set at the appropriate places at the free end of the steel sheet and the electricity is turned on. When the steel sheet is heated and elongated at a value of 0.1% of its full length, the swiveling frame is turned back to the frame of the car until the sheet is tightly fitted to the frame. Shortly thereafter, the free end should be spot welded onto the frame of the car. When the electricity has been cut off, the guiding and the electroconducting apparatuses and the bracket are removed, then the two sides of the steel sheet are welded spot in spot onto the frame by equidistant sections. After the spot welding has been done, the process of skin covering is finished.

The second embodiment of this invention (FIGS. (5) (6)) is the process of skin covering for the side wall of the railway rolling stock with a steel sheet width of 860 mm, a thickness of 2 mm and a length of 23 M. A single phase transformer of 60 KVA has been used with a primary voltage of 380 V, and a secondary voltage under 36 V.

The process of the skin covering is as follows. First, the insulation plate 31 is hung onto the transverse girder of the frame (FIG. (7)), then the steel sheet 29 is hung onto the transverse girder of the frame in turn by an adjusting plate and the horizontal position is adjusted by the sliding block 36 of the adjusting plate (FIGS. (5), (7)). The handle 37 of the sliding block 36 with a locking nut is turned to generate a grasping action through the bolt 38 and the insulation spacer 39 so as to fix the sliding block 36 on the adjusting plate.

After the relative position between the steel skin sheet and the frame has been adjusted and determined and one end of the steel skin sheet has been welded onto the frame by spot welding, the electromagnetic holding plate 33 with the electro-conducting contactors 34, hung by the spring support 48, are set apart in agreement with both ends of the steel sheet (at the free end the area for spot welding should be reserved). The holding plate is switched on so as to catch the steel sheet with the electromagnetic plates, the holding plate at the free end of the sheet is connected with the chain 35 of the piston rod from the cylinder 32, and the cylinder is started and pulls the steel sheet under tension. As the transformer is turned on, the steel sheet stretches by electric heating. When it is elongated at a set value (0.1% of the full length) the free end is welded onto the frame by spot welding. After all of this, the transformer is turned off and the electromagnetic holding plate is taken away, the cylinder action is stopped, and the insulation plate and the adjusting plate are removed. At the same time, the upper and lower sides of the steel sheet are welded onto the frame by spot welding according to the equidistant section of the spot distribution. Thus the skin covering process is finished. The determination of equidistant sections for the welding spot locations gives uniform distribution of the residual stresses in the vertical direction.

We claim:

1. An apparatus for stretching and fixing a steel skin sheet on a steel frame of a large vehicle while maintaining the steel skin sheet flat, comprising:

a bracket member including:
  a bracket base;
  a vertical column mounted on said bracket brace;
  a body portion vertically slidably mounted on the vertical column;
  a lifting nut for adjusting and fixing said body portion at a predetermined height on the vertical column;
  a fixing handle mounted relative to said body portion and said vertical column for setting the height position of said body portion;
  a pin member extending horizontally from said body portion for supporting an edge of the steel skin sheet;
  a supporting sleeve insulator surrounding said pin member;
  a constraining plate insulated from the body portion of the bracket and vertically mounted to the body of said bracket;
  a rotatable hooking plate connected to a rotatable handle through an upper end of the vertically mounted constraining plate;
a guiding apparatus including:
  a swiveling frame member adjustably mounted on a second vertical column at a first side of said swiveling frame member;
  a pair of adjusting tubes hinged to a second opposing side of said swiveling frame member;
  two adjusting rods, one fixed to each said adjusting tubes;
  a compressible spring surrounding each adjusting rod;
  an insulated gripping member fixed to the distal end of each said gripping rod and including a fastening bolt, said gripping member securing a pulling end of the skin sheet and locking the skin sheet therein with the fastening bolt; and
a single phase transformer for introducing an electrical current into said skin sheet, said transformer having a primary voltage of 220 V to 380 V and a secondary voltage of 8 V to 20 V.

2. A method for stretching and fixing steel skin sheets to steel frames of large vehicles while maintaining the steel skin sheet flat, comprising the steps of:
  (a) fixing one end of the steel skin sheet to the steel frame of the vehicle, said steel frame and said steel skin sheet being insulated from ground surface;
  (b) supporting a lower edge of a center section of the steel skin sheet on an insulated pin extending horizontally from a vertical bracket member;
  (c) grasping an upper edge of the center section of the steel skin sheet with a hooking plate;
  (d) pinching the upper edge of the center section and pressing the steel skin sheet against a vertical constraining plate extending upward from the vertical bracket member;
  (e) pulling out a pair of adjusting rods from a corresponding pair of adjuster tubes against the elasticity of respective compressible spring members formed around the adjusting rods;
  (f) inserting the free opposing end of the steel skin sheet into an insulated groove on each of a pair of gripping members fixed to the distal ends of the adjusting rods;
  (g) securing the steel skin sheet within each of the insulated grooves by tightening a fastening bolt on each of the gripping members;

(h) flattening the steel skin sheet by means of the elasticity of the compressible spring on each adjusting rod;

(i) turning a swiveling frame member to form a gap having a predetermined angle between the steel skin sheet and the steel frame;

(j) connecting two electrodes of a secondary coil of a single phase transformer to each of the two opposing ends of the steel skin sheet;

(k) switching on the transformer for heating the steel skin sheet;

(l) stretching the steel skin sheet simultaneously with said step (k) of heating the steel skin sheet, said stretching occurring at a predetermined elongation value during heating;

(m) turning the swiveling frame member to bring the stretched steel skin sheet into contact with the steel frame;

(n) welding the steel skin sheet to the steel frame prior to cooling of the heated steel skin sheet;

(o) turning off a power supply to the electrodes;

(p) removing each of the bracket member, the gripping member, and the wires connected with the single phase transformer; and (q) cooling the steel skin sheet covering the steel frame, whereby a tensile prestress is formed to maintain a flat steel skin sheet and improve the rigidity and strength of the steel frame having a steel skin sheet covering.

3. An apparatus for stretching and fixing a steel skin sheet on a steel frame of a large vehicle while maintaining the steel skin sheet flat, comprising:

an adjusting plate having a band hook fixed on an upper end thereof, said band hook being made from insulating material and being mountable on the steel frame for hanging said adjusting plate relative to said steel frame;

a gripping member provided in connection with said adjusting plate, said gripping member having an insulated groove for gripping an upper end of the steel skin sheet and an insulated grooved sliding block vertically movable on said adjusting plate for gripping a lower end of said steel skin sheet and being locked to said adjusting plate by a fastening bolt with a handle, wherein said sliding block is lockable at a predetermined height on said adjusting plate and wherein the bolt and handle are insulated from said adjusting plate;

an insulating plate hangable on the steel frame for separating the steel frame from said steel skin sheet;

a single phase transformer having a primary voltage of 220 V to 380 V and a secondary voltage of 8 V to 20 V; and a pair of electromagnetic holding plates hung on a spring support and having a plurality of electrical contacts connected thereto, wherein electricity is applied from the secondary coil of said single phase transformer to said plurality of electrical contacts to generate an electromagnetic attraction force between said steel skin sheet and said electromagnetic holding plates via chains connected to a tensile guiding cylinder.

4. A method for stretching and fixing steel skin sheets to steel frames of large vehicles while maintaining the steel skin sheet flat, comprising the steps of:

(a) hanging an insulating plate on the steel frame of the large vehicle;

(b) grasping the steel skin sheet in an adjusting plate and hanging the adjusting plate on the steel frame together with the steel skin sheet;

(c) adjusting the position of the steel skin sheet with a vertically slidable block mounted on the adjusting plate;

(d) welding one end of the steel skin sheet to a corresponding end of the steel frame;

(e) generating an electromagnetic attraction force in a pair of holding plates by applying electric current to electric contacts fixed to the holding plates;

(f) flattening the steel skin sheet with a tensile cylinder fixed to the electromagnetic holding plates by chains, wherein said holding plates are adjoining the steel skin sheet;

(g) switching on a circuit of the electromagnetic holding plates which are connected with two electrodes of the secondary coil of the single phase transformer;

(h) switching on the circuit of the secondary coil of the single phase transformer, wherein the steel skin sheet is stretched by heating thereof;

(i) welding a free end and an upper and lower side of the steel skin sheet onto the steel frame while stretching the steel skin sheet; and (j) simultaneously pulling out the insulating plate, removing the adjusting plate and the holding plates, and cutting off the circuits through the steel skin sheet and the electromagnetic holding plates, wherein a tensile prestress is formed in the steel skin sheet as it cools, thereby maintaining the steel skin sheet flat and improving its rigidity.

* * * * *